(12) United States Patent
Inoh et al.

(10) Patent No.: US 11,273,706 B2
(45) Date of Patent: Mar. 15, 2022

(54) DRIVE DEVICE FOR FOUR-WHEEL DRIVE VEHICLE

(71) Applicant: SUBARU CORPORATION, Tokyo (JP)

(72) Inventors: Takahito Inoh, Tokyo (JP); Naohiro Imamura, Tokyo (JP); Mamoru Murakami, Tokyo (JP); Koki Mitsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/995,007

(22) Filed: Aug. 17, 2020

(65) Prior Publication Data

US 2021/0086611 A1 Mar. 25, 2021

(30) Foreign Application Priority Data

Sep. 20, 2019 (JP) .............................. JP2019-171277

(51) Int. Cl.
*B60K 17/34* (2006.01)
*B60K 17/02* (2006.01)
(Continued)

(52) U.S. Cl.
CPC ................ *B60K 17/34* (2013.01); *B60K 1/02* (2013.01); *B60K 17/02* (2013.01); *B60K 17/06* (2013.01);
(Continued)

(58) Field of Classification Search
CPC ........ B60K 17/34; B60K 17/02; B60K 17/16; B60K 17/165; B60K 17/348;
(Continued)

(56) References Cited

U.S. PATENT DOCUMENTS 5,285,866 A * 2/1994 Ackroyd ............. B60L 15/2036
180/248
7,497,285 B1 * 3/2009 Radev ................... B60W 20/00
180/65.225

(Continued)

FOREIGN PATENT DOCUMENTS

JP 2016-92995 A 5/2016
JP 2018-17354 A 2/2018
(Continued)

*Primary Examiner* — Roger L Pang
(74) *Attorney, Agent, or Firm* — Troutman Pepper Hamilton Sanders LLP (57) ABSTRACT

A drive device includes a first clutch mechanism that couples or decouples power transmission systems for front and rear wheels, a first electric motor disposed on a front or rear wheel side and coupled to the first clutch mechanism, a second electric motor disposed on the other of the front and rear wheel sides and coupled to the first clutch mechanism, a second clutch mechanism that couples or decouples the first electric motor and front drive shafts, a planetary gear mechanism that distributes output of the first electric motor to the first and second clutch mechanisms, and a third clutch mechanism that limits a difference between a first rotational element that transmits the output of the first electric motor to the first clutch mechanism and a second rotational element that transmits the output of the first electric motor to the second clutch mechanism.

15 Claims, 8 Drawing Sheets

(51) Int. Cl.
  *B60K 1/02* (2006.01)
  *B60K 17/06* (2006.01)
  *F16H 48/19* (2012.01)
  *B60K 17/16* (2006.01)
  *F16H 37/08* (2006.01)
  *F16H 48/08* (2006.01)
  *B60K 17/22* (2006.01)
  *B60W 10/02* (2006.01)
  *B60W 10/08* (2006.01)
  *B60W 30/188* (2012.01)
  *F16H 48/00* (2012.01)
  *F16H 48/05* (2012.01)

(52) U.S. Cl.
  CPC .............. *B60K 17/16* (2013.01); *B60K 17/22* (2013.01); *B60W 10/02* (2013.01); *B60W 10/08* (2013.01); *B60W 30/188* (2013.01); *F16H 37/0806* (2013.01); *F16H 48/08* (2013.01); *F16H 48/19* (2013.01); *B60L 2260/28* (2013.01); *F16H 48/05* (2013.01); *F16H 2048/02* (2013.01)

(58) Field of Classification Search
  CPC .......... B60K 17/352; B60K 2023/0808; B60K 2023/816; B60K 1/02; B60K 17/06; B60K 174/16; B60K 2023/0825; B60K 2023/0833; B60K 23/04; B60K 23/08; F16H 37/0806; F16H 48/05; F16H 2048/02; F16H 48/08; F16H 48/19; F16H 2200/0021; B60W 10/02; B60W 10/08; B60W 30/188; B60L 2260/28
  USPC .......................................... 475/5, 151, 221
  See application file for complete search history.

(56) References Cited

U.S. PATENT DOCUMENTS

| | | | | |
|---|---|---|---|---|
| 9,789,871 | B1* | 10/2017 | Dlala | B60W 10/14 |
| 9,933,049 | B2* | 4/2018 | Kimes | F16H 3/728 |
| 2005/0103551 | A1* | 5/2005 | Matsuno | B60K 23/04 |
| | | | | 180/243 |
| 2019/0178350 | A1* | 6/2019 | Steinberger | B60K 1/02 |
| 2020/0369147 | A1* | 11/2020 | Kondo | B60K 23/08 |

FOREIGN PATENT DOCUMENTS

| | | | |
|---|---|---|---|
| JP | 2018052320 A | * | 4/2018 |
| JP | 2018-70076 A | | 5/2018 |

* cited by examiner

|  | HIGH LOAD REGION | INTERMEDIATE REGION | LOW LOAD REGION OR REGENERATION |
|---|---|---|---|
|  | FIRST TRAVEL MODE | INTERMEDIATE MODE | SECOND TRAVEL MODE |
| FIRST CLUTCH MECHANISM | ENGAGED | ENGAGED | DISENGAGED |
| SECOND CLUTCH MECHANISM | ENGAGED | ENGAGED | ENGAGED |
| THIRD CLUTCH MECHANISM | DISENGAGED | DISENGAGED | ENGAGED |
| FOURTH CLUTCH MECHANISM | ENGAGED | DISENGAGED | DISENGAGED |
| FIFTH CLUTCH MECHANISM | ENGAGED | DISENGAGED | DISENGAGED |
| FIRST MOTOR | OUTPUT CONTROL | EFFICIENCY POINT | OUTPUT CONTROL |
| SECOND MOTOR | OUTPUT CONTROL | OUTPUT CONTROL OR GRADUAL CHANGE | STOP |

|  | FRONT WHEEL DRIVE | | REAR WHEEL DRIVE | | FOUR WHEEL DRIVE |
|  | ONE MOTOR | TWO MOTORS | ONE MOTOR | TWO MOTORS | TWO MOTORS |
| --- | --- | --- | --- | --- | --- |
| FIRST CLUTCH MECHANISM | DISENGAGED | ENGAGED | DISENGAGED | ENGAGED | ENGAGED |
| SECOND CLUTCH MECHANISM | ENGAGED | ENGAGED | DISENGAGED | DISENGAGED | ENGAGED |
| THIRD CLUTCH MECHANISM | ENGAGED | DISENGAGED | DISENGAGED | ENGAGED | DISENGAGED |
| FOURTH CLUTCH MECHANISM | DISENGAGED | DISENGAGED | VARIABLE | VARIABLE | VARIABLE |
| FIFTH CLUTCH MECHANISM | DISENGAGED | DISENGAGED | VARIABLE | VARIABLE | VARIABLE |
| FIRST MOTOR | OUTPUT CONTROL | OUTPUT CONTROL | STOP | OUTPUT CONTROL | OUTPUT CONTROL |
| SECOND MOTOR | STOP | OUTPUT CONTROL | OUTPUT CONTROL | OUTPUT CONTROL | OUTPUT CONTROL |

DRIVE DEVICE FOR FOUR-WHEEL DRIVE VEHICLE

CROSS-REFERENCE TO RELATED APPLICATIONS

The present application claims priority from Japanese Patent Application No. 2019-171277 filed on Sep. 20, 2019, the entire contents of which are hereby incorporated by reference.

BACKGROUND

The disclosure relates to a drive device for an electric-motor four-wheel drive vehicle.

Four-wheel drive electric vehicles that use output of an electric motor as a driving force have been recently under development. Non-limiting example styles of driving such electric-motor four-wheel drive vehicles include an in-wheel motor style where drive motors are respectively provided inside of wheels, and a style where output of an electric motor is transmitted to wheels via a power transmission mechanism. Japanese Unexamined Patent Application Publication (JP-A) No. 2016-92995 discloses, for example, an in-wheel-motor four-wheel drive vehicle. JP-A No. 2018-70076 discloses a twin-motor four-wheel drive vehicle where two drive motors separately drive front wheels and rear wheels.

SUMMARY

An aspect of the disclosure provides a drive device for an electric-motor four-wheel drive vehicle. The drive device includes a first clutch mechanism, a first electric motor, a second electric motor, a second clutch mechanism, a planetary gear mechanism, and a third clutch mechanism. The first clutch mechanism is configured to perform switching between connection and disconnection of a power transmission system for front wheels and a power transmission system for rear wheels. The first electric motor is disposed on one of a front wheel side and a rear wheel side with respect to the first clutch mechanism. The first electric motor is coupled to the first clutch mechanism. The front wheel side is a side on which the front wheels are provided, and the rear wheel side is a side on which the rear wheels are provided. The second electric motor is disposed on the other of the front wheel side and the rear wheel side with respect to the first clutch mechanism. The second electric motor is coupled to the first clutch mechanism. The second clutch mechanism is configured to perform switching between connection and disconnection of the first electric motor and drive shafts for the front wheels. The planetary gear mechanism is configured to distribute output of the first electric motor to the first clutch mechanism and the second clutch mechanism. The third clutch mechanism is configured to limit a difference between a first rotational element in the planetary gear mechanism and a second rotational element in the planetary gear mechanism. The first rotational element is configured to transmit the output of the first electric motor to the first clutch mechanism. The second rotational element is configured to transmit the output of the first electric motor to the second clutch mechanism.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In the four-wheel drive vehicles described in JP-A Nos. 2016-92995 and 2018-70076, driving force transmission mechanisms are at least mechanically separated from each other on a front wheel side and a rear wheel side. This makes it difficult to fully use output of an electric motor in a case where either ones of front wheels and rear wheels are intended to be driven. In a case where one or both of the rear wheels is or are stuck in mud, falling into a slipping state, for example, the vehicle has to exert, via the front wheels, a greater driving force to escape from there. Even in this case, however, it might be difficult to transmit output of the electric motor, which is to be used for driving the rear wheels, to the front wheels. That is, it might be difficult to fully use a driving force of the electric motor.

In a case where driving force transmission mechanisms are separated from each other on a front wheel side and a rear wheel side, rotation or torque of front wheels and rear wheels at least has to be synchronized through an electric control. This accordingly would lower responsiveness. Furthermore, ordinary electric vehicles where an electric motor and wheels are coupled to each other via a reducer may face difficulties in allowing the electric motor to perform driving or regeneration at an aimed efficiency point.

It is desirable to provide such a drive device for a four-wheel drive vehicle that makes it possible to fully utilize output of an electric motor, as well as to drive the electric motor highly efficiently.

In the following, some example embodiments of the disclosure are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

[1. Overall Configuration of Drive Device]

Figure 1:
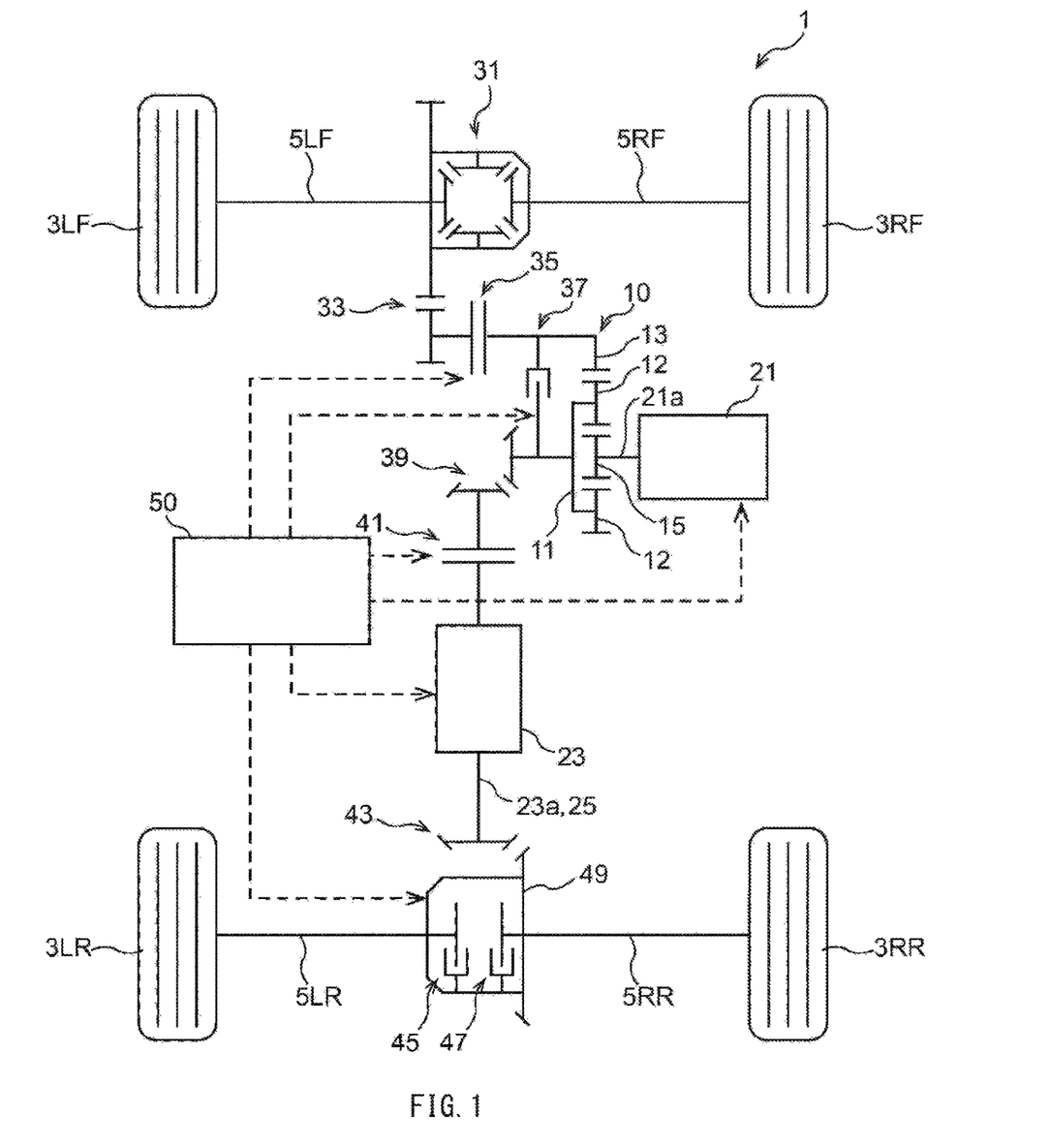
FIG. 1 is a schematic view of a drive device for a four-wheel drive vehicle, according to an example embodiment of the disclosure, illustrating a configuration example.

An overall configuration of a drive device for a four-wheel drive vehicle, according to an example embodiment of the disclosure, will now be described below with reference to FIG. 1. FIG. 1 is a schematic view of a drive device 1 according to the example embodiment, illustrating the overall configuration. The drive device 1 illustrated in FIG. 1 may be a drive device for an all-wheel drive (AWD) electric vehicle. In the AWD electric vehicle, front wheels 3LF and 3RF and rear wheels 3LR and 3RR may be driven by electric motors.

The drive device 1 may include a first motor 21, a second motor 23, a first differential mechanism 10, a second differential mechanism 31, a first clutch mechanism 41, a second clutch mechanism 35, a third clutch mechanism 37, a fourth clutch mechanism 45, a fifth clutch mechanism 47, and a controller 50. A drive shaft 5LF for the front left wheel 3LF and a drive shaft 5RF for the front right wheel 3RF may be coupled to each other via the second differential mechanism 31. A drive shaft 5LR for the rear left wheel 3LR and a drive shaft 5RR for the rear right wheel 3RR may be coupled to each other via the fourth clutch mechanism 45 and the fifth clutch mechanism 47.

In one embodiment, the first differential mechanism 10 may serve as a "planetary gear mechanism". The first differential mechanism 10 may include a sun gear 15, pinion gears 12, a ring gear 13, and a carrier 11. The carrier 11 may support the pinion gears 12. An output shaft 21a of the first motor 21 may be coupled to the sun gear 15. Output torque of the first motor 21 may thus be transmitted, via the sun gear 15, to the first differential mechanism 10. The first differential mechanism 10 may distribute the output torque of the first motor 21 to the first clutch mechanism 41 on a rear wheel side and the second clutch mechanism 35 on a front wheel side. In a specific but non-limiting example, the output torque of the first motor 21 may be partially transmitted to the second differential mechanism 31 via the pinion gears 12, the ring gear 13, the second clutch mechanism 35, and a gear mechanism 33. The output torque of the first motor 21 may be partially transmitted to a propeller shaft 25 via the pinion gears 12, the carrier 11, and an orthogonal gear 39. The first differential mechanism 10 may be configured to generate differential rotation between the front wheel side and the rear wheel side.

The second differential mechanism 31 may include a known differential gear. The differential gear may include two side gears and two pinion gears. The two side gears may be respectively coupled to the drive shaft 5LF for the front left wheel 3LF and the drive shaft 5RF for the front right wheel 3RF. The two pinion gears may respectively engage with the two side gears. The second differential mechanism 31 may be configured to generate differential rotation between the front left wheel 3LF and the front right wheel 3RF in a case where the vehicle makes a turn or travels on a rough road, for example. In one embodiment, the second differential mechanism 31 may serve as a "differential mechanism".

The first clutch mechanism 41 may be provided between the orthogonal gear 39 coupled to the first differential mechanism 10, and the propeller shaft 25. The first clutch mechanism 41 may be controlled by the controller 50 to perform switching between engagement and disengagement. The first clutch mechanism 41 may serve to perform switching between connection and disconnection of a power transmission system for the front wheels and a power transmission system for the rear wheels. The first motor 21 may be coupled to the front wheel side with respect to the first clutch mechanism 41. The second motor 23 may be coupled to the rear wheel side with respect to the first clutch mechanism 41. As long as the first clutch mechanism 41 is configured to switch whether power is to be transmitted, the configuration of the first clutch mechanism 41 may not be particularly limited. The second clutch mechanism 35 may be, for example, a known clutch mechanism such as a dog clutch or such a disconnection mechanism as exemplified in JP-A No. 2018-17354.

The second clutch mechanism 35 may be provided on a power transmission route from the first differential mechanism 10 to the front wheel side. The second clutch mechanism 35 may be controlled by the controller 50 to perform switching between engagement and disengagement. The second clutch mechanism 35 may serve to switch whether output of the first motor 21 and the second motor 23 is to be transmitted to the front wheel side. The second clutch mechanism 35 may as well serve to separate the front wheel side and the rear wheel side from each other. In a case where the vehicle is caused to travel under front wheel driving or four wheel driving, for example, the second clutch mechanism 35 may be engaged. In a case where the vehicle is caused to travel under rear wheel driving, the second clutch mechanism 35 may be disengaged. As long as the second clutch mechanism 35 is configured to switch whether power is to be transmitted, the configuration of the second clutch mechanism 35 may not be particularly limited. The second clutch mechanism 35 may be, for example, a known clutch mechanism such as a dog clutch or such a disconnection mechanism as exemplified in JP-A No. 2018-17354.

The third clutch mechanism 37 may serve to limit a difference between a first rotational element and a second rotational element of the first differential mechanism 10. The first rotational element may be disposed closer to the first clutch mechanism 41. The second rotational element may be disposed closer to the second clutch mechanism 35. In the example embodiment, the third clutch mechanism 37 may be provided between the carrier 11 and the ring gear 13. The third clutch mechanism 37 may be controlled by the controller 50 to adjust an engagement force. In a state where the third clutch mechanism 37 is fully engaged, the first differential mechanism 10 may be limited from generating a difference. The carrier 11 and the ring gear 13 may thus be in a directly coupled state. This makes it possible to transmit identical rotation (torque) to the front wheel side and the rear wheel side. Furthermore, the adjusted engagement force of the third clutch mechanism 37 may allow power transmission efficiency between the carrier 11 and the ring gear 13 to become variable. As long as the third clutch mechanism 37 is configured to adjust an engagement force, the configuration of the third clutch mechanism 37 may not be particularly limited.

The fourth clutch mechanism 45 and the fifth clutch mechanism 47 may be coupled to the propeller shaft 25 via an orthogonal gear 43 and a clutch case 49. The fourth clutch mechanism 45 may be provided between the drive shaft 5LR for the rear left wheel 3LR and the clutch case 49. The fourth clutch mechanism 45 may be controlled by the controller 50 to adjust an engagement force. The fifth clutch mechanism 47 may be provided between the drive shaft 5RR for the rear right wheel 3RR and the clutch case 49. The fifth clutch mechanism 47 may be controlled by the controller 50 to adjust an engagement force.

The drive shaft 5LF for the front left wheel 3LF and the drive shaft 5RF for the front right wheel 3RF may be coupled to each other via the second differential mechanism 31. This makes it possible to distribute a driving force. The drive shaft 5LR for the rear left wheel 3LR and the drive shaft 5RR for the rear right wheel 3RR may be each coupled to the clutch case 49 via the fourth clutch mechanism 45 or the fifth clutch mechanism 47. This makes it possible to adjust power transmission efficiency independently from each other. As long as the fourth clutch mechanism 45 and the fifth clutch mechanism 47 are each configured to adjust an engagement force, the configurations of the fourth clutch mechanism 45 and the fifth clutch mechanism 47 may not be particularly limited. Instead of using the fourth clutch mechanism 45 and the fifth clutch mechanism 47, the drive shaft 5LR for the rear left wheel 3LR and the drive shaft 5RR for the rear right wheel 3RR may be coupled to each other via a differential mechanism. By using the fourth clutch mechanism 45 and the fifth clutch mechanism 47, however, it is possible to finely adjust differential rotation between the rear left wheel 3LR and the rear right wheel 3RR. This makes it possible to improve turning performance.

The first motor 21 and the second motor 23 may be known synchronous motors, for example. The first motor 21 and the second motor 23 may be controlled by a non-illustrated inverter controlled by the controller 50. The first motor 21 may be coupled to one of the front wheel side and the rear wheel side with respect to the first clutch mechanism 41. In the example embodiment, the first motor 21 may be coupled to the front wheel side with respect to the first clutch mechanism 41. The output shaft 21a of the first motor 21 may be coupled to the first differential mechanism 10. The output shaft 21a of the first motor 21 may be disposed in substantially parallel to the drive shafts 5LF and 5RF for the front wheels. This makes it possible to efficiently transmit output torque to be outputted from the first motor 21 to the second differential mechanism 31 provided to the drive shafts 5LF and 5RF for the front wheels, where no orthogonal gear is interposed.

In a specific but non-limiting example, the output torque to be outputted from the first motor 21 may be transmitted to the front left wheel 3LF and the front right wheel 3RF via the first differential mechanism 10, the second clutch mechanism 35, the gear mechanism 33, the second differential mechanism 31, and the drive shafts 5LF and 5RF. The output torque to be outputted from the first motor 21 may also be transmitted to the rear left wheel 3LR and the rear right wheel 3RR via the first differential mechanism 10, the orthogonal gear 39, the first clutch mechanism 41, the propeller shaft 25, the orthogonal gear 43, the clutch case 49, the fourth clutch mechanism 45 or the fifth clutch mechanism 47, and the drive shafts 5LR and 5RR.

The second motor 23 may be coupled to the other of the front wheel side and the rear wheel side with respect to the first clutch mechanism 41. In the example embodiment, the second motor 23 may be coupled to the rear wheel side with respect to the first clutch mechanism 41. An output shaft 23a of the second motor 23 may be coupled to the propeller shaft 25 configured to transmit a driving force (rotation) between the front wheel side and the rear wheel side. In the example illustrated in FIG. 1, the output shaft 23a of the second motor 23 may also serve as the propeller shaft 25. The output shaft 23a of the second motor 23 and the propeller shaft 25 may however be separate bodies coupled to each other via a gear mechanism.

Output torque to be outputted from the second motor 23 may be transmitted to the front left wheel 3LF and the front right wheel 3RF via the first clutch mechanism 41, the orthogonal gear 39, the third clutch mechanism 37, the second clutch mechanism 35, the gear mechanism 33, the second differential mechanism 31, and the drive shafts 5LF and 5RF. The output torque to be outputted from the second motor 23 may also be transmitted to the rear left wheel 3LR and the rear right wheel 3RR via the orthogonal gear 43, the clutch case 49, the fourth clutch mechanism 45 or the fifth clutch mechanism 47, and the drive shafts 5LR and 5RR.

Figure 2:
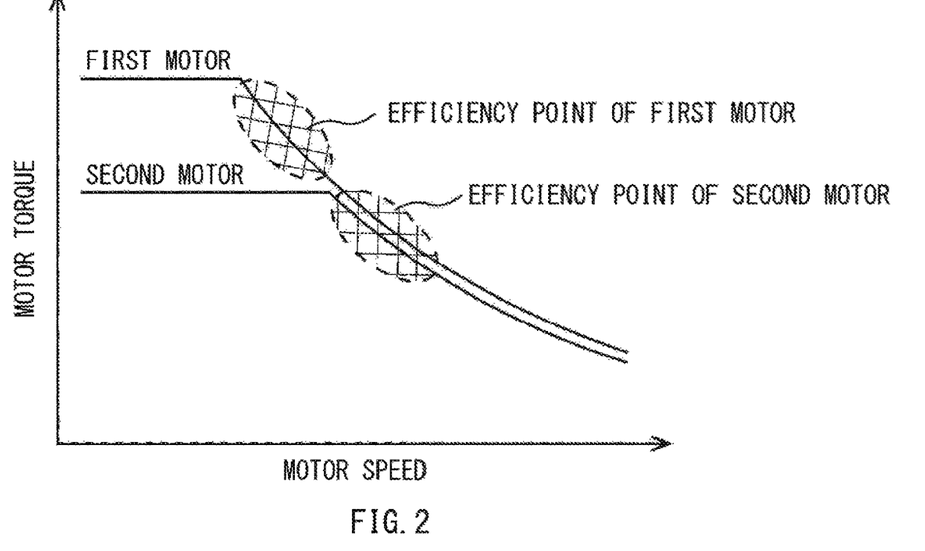
FIG. 2 is an explanatory diagram of characteristics of a first motor and a second motor.

FIG. 2 is an explanatory diagram of characteristics of the first motor 21 and the second motor 23. Maximum rated torque of the first motor 21 may be greater than maximum rated torque of the second motor 23. Rotations at which the first motor 21 is able to output the maximum rated torque may be lower than rotations at which the second motor 23 is able to output the maximum rated torque. That is, the first motor 21 may be configured to efficiently output the maximum rated torque within a region where its rotations are lower in speed than rotations of the second motor 23. The second motor 23 may be configured to efficiently output the maximum rated torque within a region where its rotations are higher in speed than rotations of the first motor 21 (as illustrated with "efficiency points" in FIG. 2).

The controller 50 may include, for example, a processor such as a central processing unit (CPU) or a micro processing unit (MPU), an electric circuit, and a storage device such as a random access memory (RAM) and a read only memory (ROM). The controller 50 may partially or wholly be updatable firmware, for example. The controller 50 may otherwise partially or wholly be a program module to be executed under an instruction to be provided from a CPU, for example.

In the drive device 1 according to the example embodiment, the first motor 21 and the second motor 23 may be mechanically coupled to the front, rear, left, and right drive wheels 3LF, 3RF, 3LR, and 3RR. This accordingly makes it possible to allow output of the first motor 21 and the second motor 23 to be transmitted to the front wheel side and the rear wheel side. In a case where either one of the front wheel side and the rear wheel side is to be driven, this therefore makes it possible to fully utilize total output of the first motor 21 and the second motor 23. In the drive device 1 according to the example embodiment, engaging the first clutch mechanism 41 may couple the power transmission system for the front wheels and the power transmission system for the rear wheels. This accordingly makes it possible to mechanically synchronize rotation (torque) on the front wheel side and the rear wheel side, improving responsiveness.

In the drive device 1 according to the example embodiment, the first motor 21 and the second motor 23 may both be mechanically coupled to the front, rear, left, and right drive wheels 3LF, 3RF, 3LR, and 3RR. This accordingly makes it possible to highly efficiently drive the first motor 21 and the second motor 23 respectively around the efficiency points. This therefore makes it possible to separately use the first motor 21 and the second motor 23 in accordance with a driving force requested for the vehicle. This accordingly makes it possible to efficiently control how the vehicle is driven.

Furthermore, in the drive device 1 according to the example embodiment, it is possible to cause the first clutch mechanism 41, the second clutch mechanism 35, the fourth clutch mechanism 45, or the fifth clutch mechanism 47 to separate the front wheel side and the rear wheel side from each other. This therefore makes it possible to cause the vehicle to travel under switching among front wheel driving, rear wheel driving, and four wheel driving.

[2. Operational Example]

Next, an operational example of the drive device 1 according to the example embodiment will be described below.

[2.1. Separately Using Motors]

Figure 3:
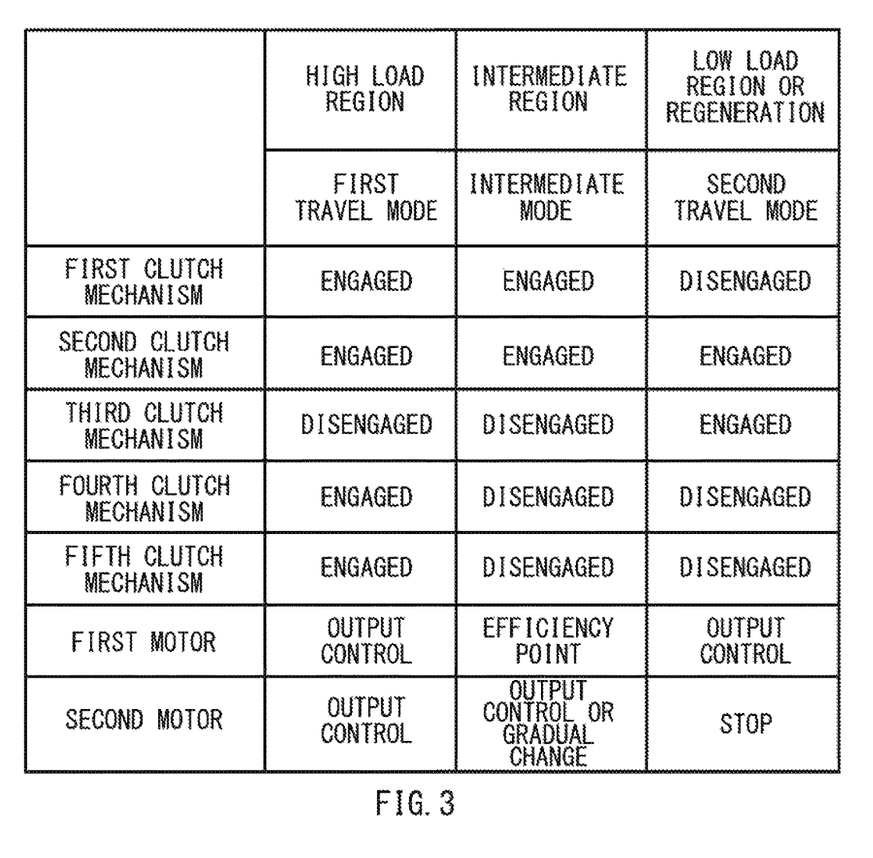
FIG. 3 is an explanatory diagram of operational examples, in respective loaded states of the vehicle, of the drive device according to the example embodiment.

An example of separately using the first motor 21 and the second motor 23 will first be described below with reference to FIGS. 3 to 6. FIG. 3 is an explanatory diagram, in respective loaded states of the vehicle, of engagement states of the first clutch mechanism 41, the second clutch mechanism 35, the third clutch mechanism 37, the fourth clutch mechanism 45, and the fifth clutch mechanism 47, and drive states of the first motor 21 and the second motor 23.

Figure 4:
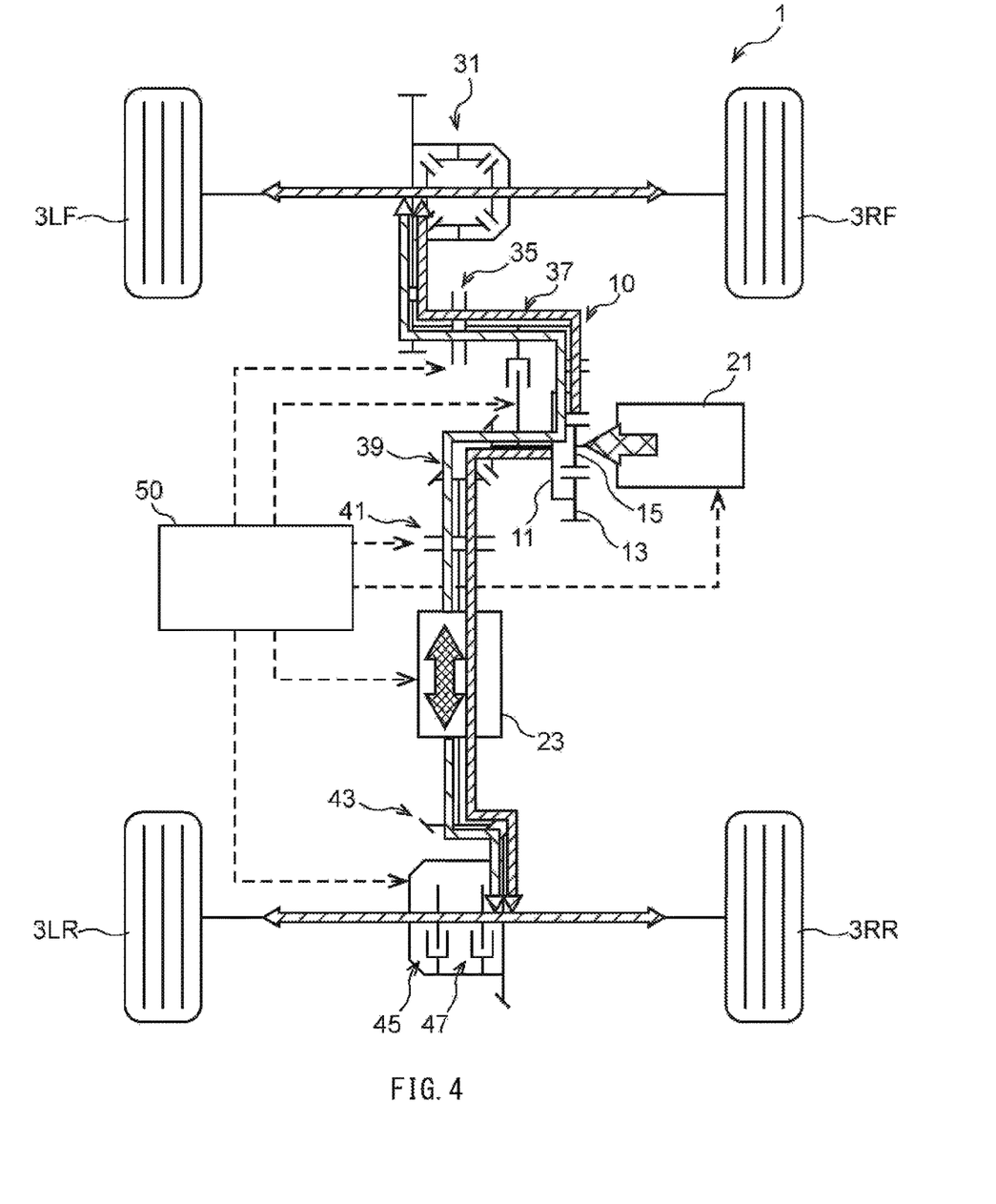
FIG. 4 is an explanatory diagram of the drive device, illustrating an example in a case where its operation falls within a high load region.

In a high load region where the vehicle has been started (traveling has been started) or requested acceleration is greater, for example, the vehicle may be requested to exert a relatively greater driving force. In this case, a control mode may be set to a first travel mode. In the first travel mode, the controller 50 may set the first clutch mechanism 41, the second clutch mechanism 35, the fourth clutch mechanism 45, and the fifth clutch mechanism 47 in an engaged state. Meanwhile, the controller 50 may set the third clutch mechanism 37 in a disengaged state. The controller 50 may then drive both the first motor 21 and the second motor 23. This accordingly may transmit, as illustrated in FIG. 4, output of the first motor 21 and the second motor 23 to the front, rear, left, and right drive wheels 3LF, 3RF, 3LR, and 3RR. It is thus possible to utilize the output of both the first motor 21 and the second motor 23 to cause the vehicle to travel. With the third clutch mechanism 37 in the disengaged state, the first differential mechanism 10 may be permitted to generate differential rotation between the front wheel side and the rear wheel side. This makes it possible to improve traveling performance including turning performance.

In the first travel mode, the controller 50 may drive either one or both of the first motor 21 and the second motor 23 around the efficiency points. This makes it possible to totally achieve highly efficient driving of the vehicle. In the example embodiment, it is possible, with the fourth clutch mechanism 45 and the fifth clutch mechanism 47, to independently adjust driving forces to be transmitted to the rear left wheel 3LR and the rear right wheel 3RR. This therefore allows the controller 50 to adjust respective engagement forces of the fourth clutch mechanism 45 and the fifth clutch mechanism 47 on the basis of a vehicle speed, acceleration, and a steering angle, for example, improving turning performance. In the first travel mode, the third clutch mechanism 37 may be engaged to eliminate differential rotation between the front and rear wheel sides to zero.

Figure 5:
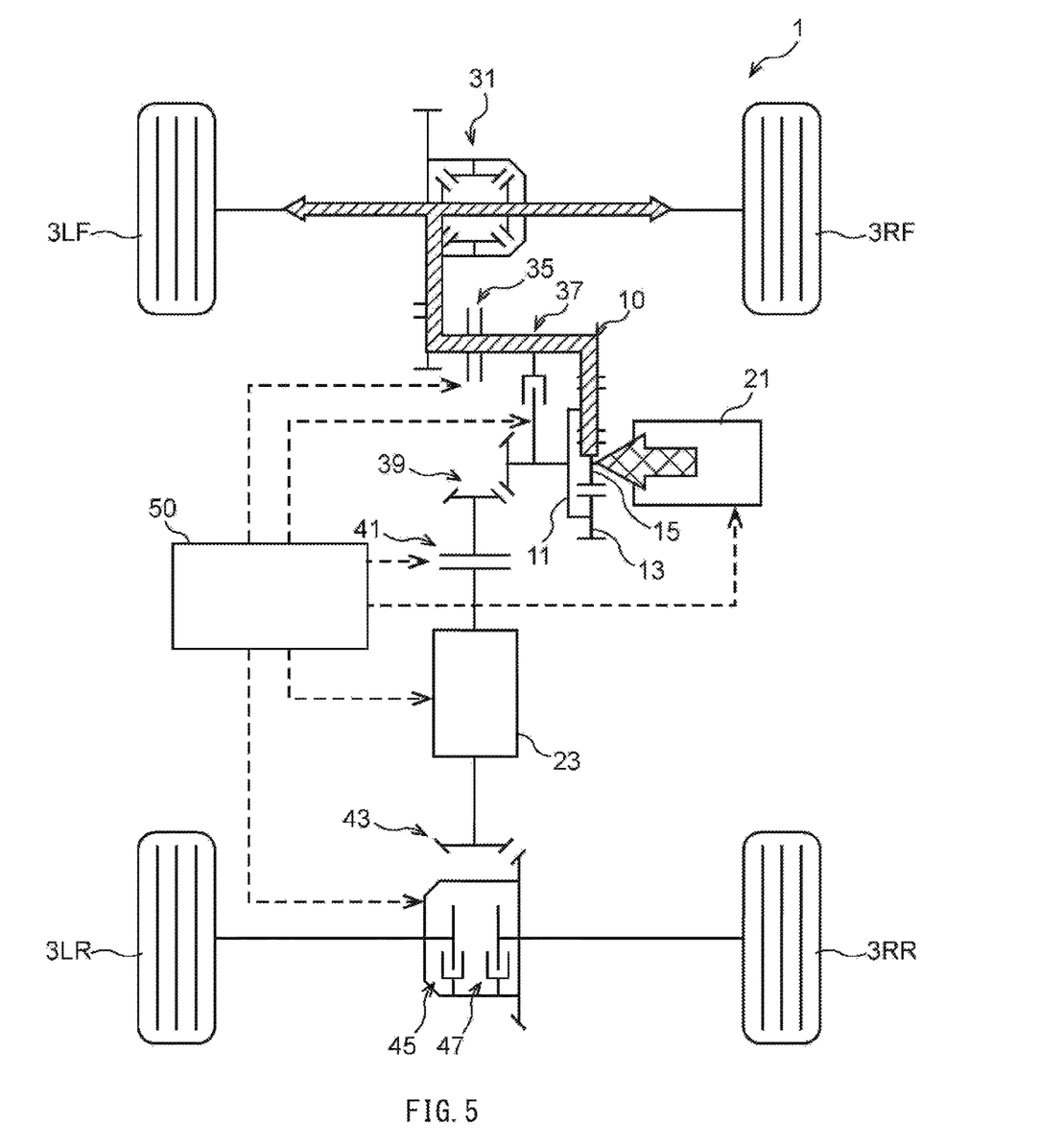
FIG. 5 is an explanatory diagram of the drive device, illustrating an example in a case where its operation falls within a low load region.

In a low load region where the vehicle travels at a constant speed or requested acceleration is smaller, for example, the vehicle may be requested to exert a relatively smaller driving force. In this case, the control mode may be set to a second travel mode. In the second travel mode, the controller 50 may set the second clutch mechanism 35 and the third clutch mechanism 37 in the engaged state. Meanwhile, the controller 50 may disengage the first clutch mechanism 41, the fourth clutch mechanism 45, and the fifth clutch mechanism 47. In this state, the controller 50 may stop the second motor 23. The controller 50 may thus control output of the first motor 21 in accordance with a requested driving force. This accordingly makes it possible, as illustrated in FIG. 5, to cause the vehicle to travel with only the first motor 21 configured to efficiently transmit a driving force to the front wheel side, where no orthogonal gear is interposed. In a case where the vehicle decelerates, the controller 50 may set the control mode to the second travel mode to perform a regeneration control. This makes it possible to efficiently generate electric power.

Figure 6:
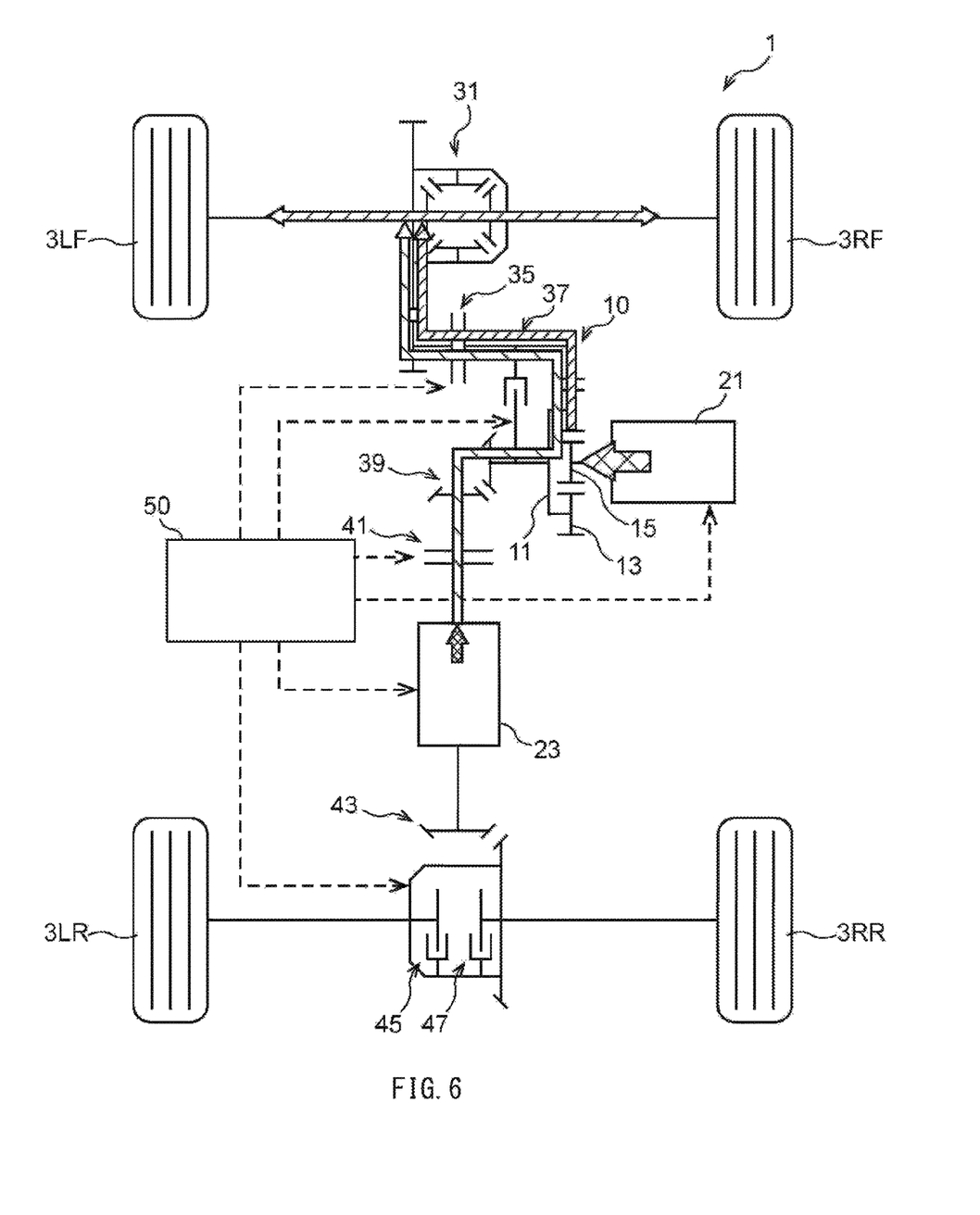
FIG. 6 is an explanatory diagram of the drive device, illustrating an example in a case where its operation falls within an intermediate region.

In an intermediate region between the high load region and the low load region, the control mode may be set to an intermediate mode. In the intermediate mode, the controller 50 may set the first clutch mechanism 41 and the second clutch mechanism 35 in the engaged state. Meanwhile, the controller 50 may set the third clutch mechanism 37, the fourth clutch mechanism 45, and the fifth clutch mechanism 47 in the disengaged state. While driving the first motor 21 configured to efficiently transmit power to the front wheel side, where no orthogonal gear is interposed, the controller 50 may control a drive state or a regeneration state of the second motor 23, where power is to be transmitted via the orthogonal gear 39, as illustrated in FIG. 6. This makes it possible to achieve variable speed driving. This accordingly makes it possible to allow the vehicle to totally achieve highly efficient driving. This also makes it possible to achieve a smooth transition between the high load region and the low load region.

In the intermediate region, the controller 50 may otherwise set the second clutch mechanism 35 in the engaged state. Meanwhile, the controller 50 may allow engagement forces of the first clutch mechanism 41 and the third clutch mechanism 37 to gradually change. The controller 50 may as well allow output of the first motor 21 and the second motor 23 to gradually change. This also makes it possible to achieve variable speed driving. In this case, the closer to the low load region, the controller 50 may allow an engagement force of the first clutch mechanism 41 to decrease. Meanwhile, the controller 50 may allow an engagement force of the third clutch mechanism 37 to increase. The controller 50 may further adjust the output of the first motor 21, and allow the output of the second motor 23 to gradually decrease. This accordingly makes it possible to allow the vehicle to totally achieve highly efficient driving. This also makes it possible to achieve a smooth transition between the high load region and the low load region.

[2.2. Switching of Drive Mode]

Figure 7:
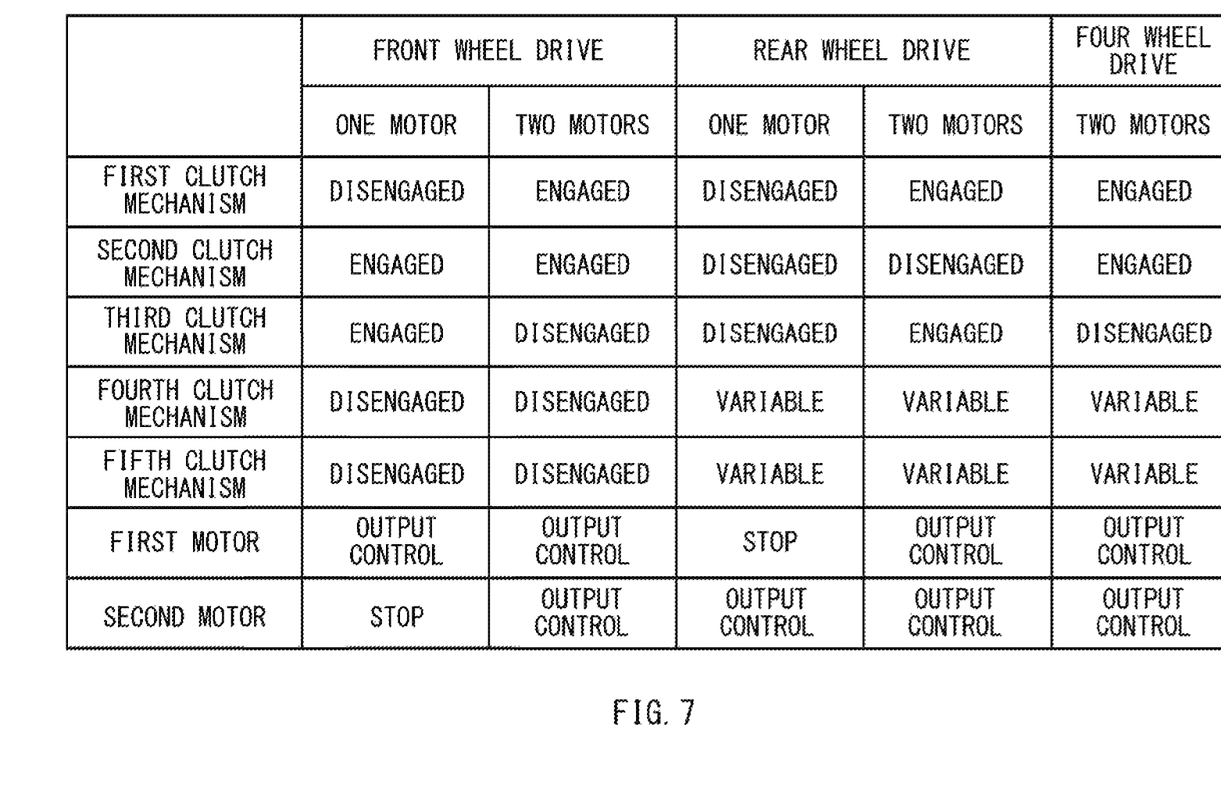
FIG. 7 is an explanatory diagram of operational examples, in respective drive modes, of the drive device according to the example embodiment.
Figure 8:
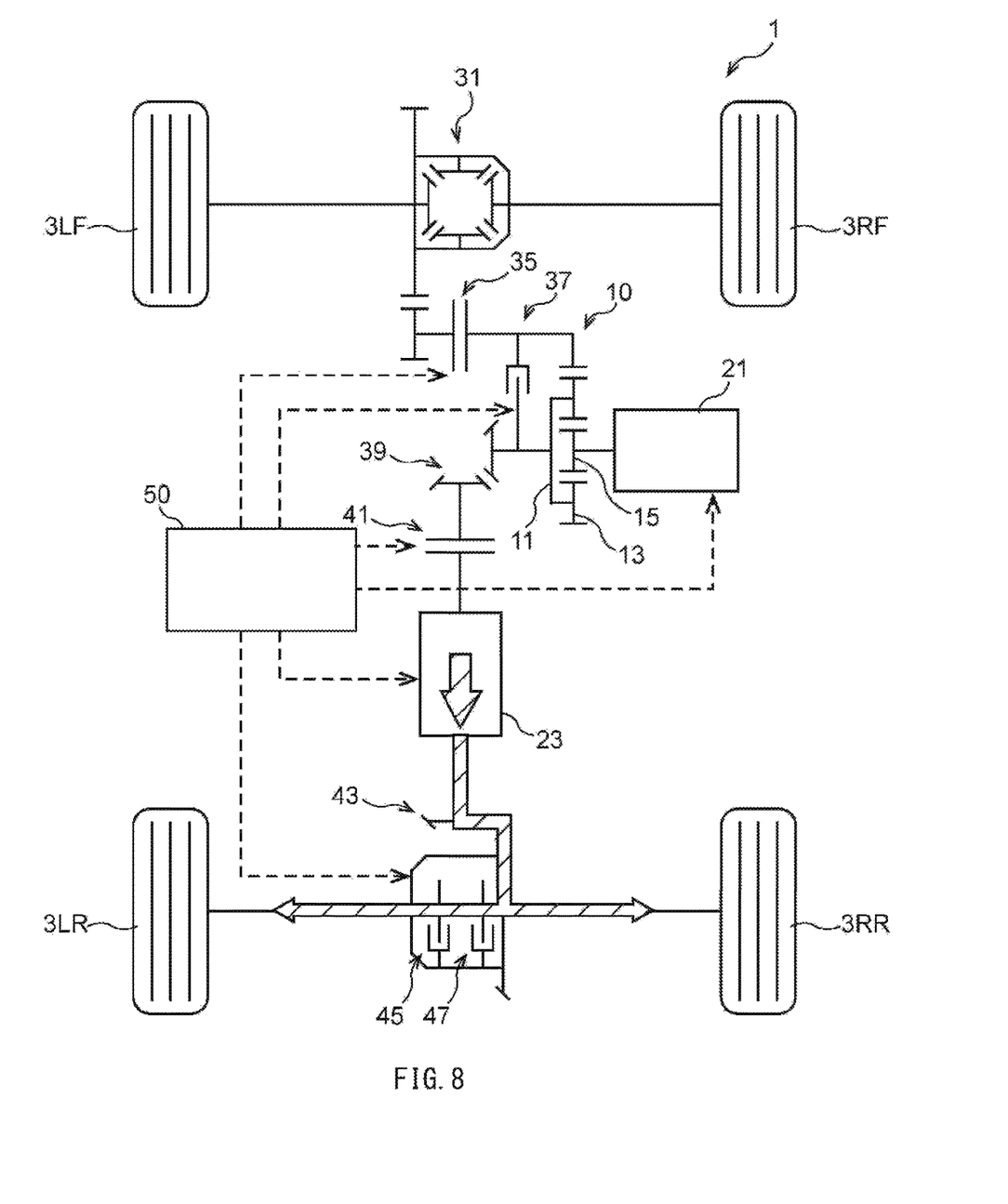
FIG. 8 is an explanatory diagram of the drive device, illustrating an operational example in a rear-wheel drive mode.
Figure 9:
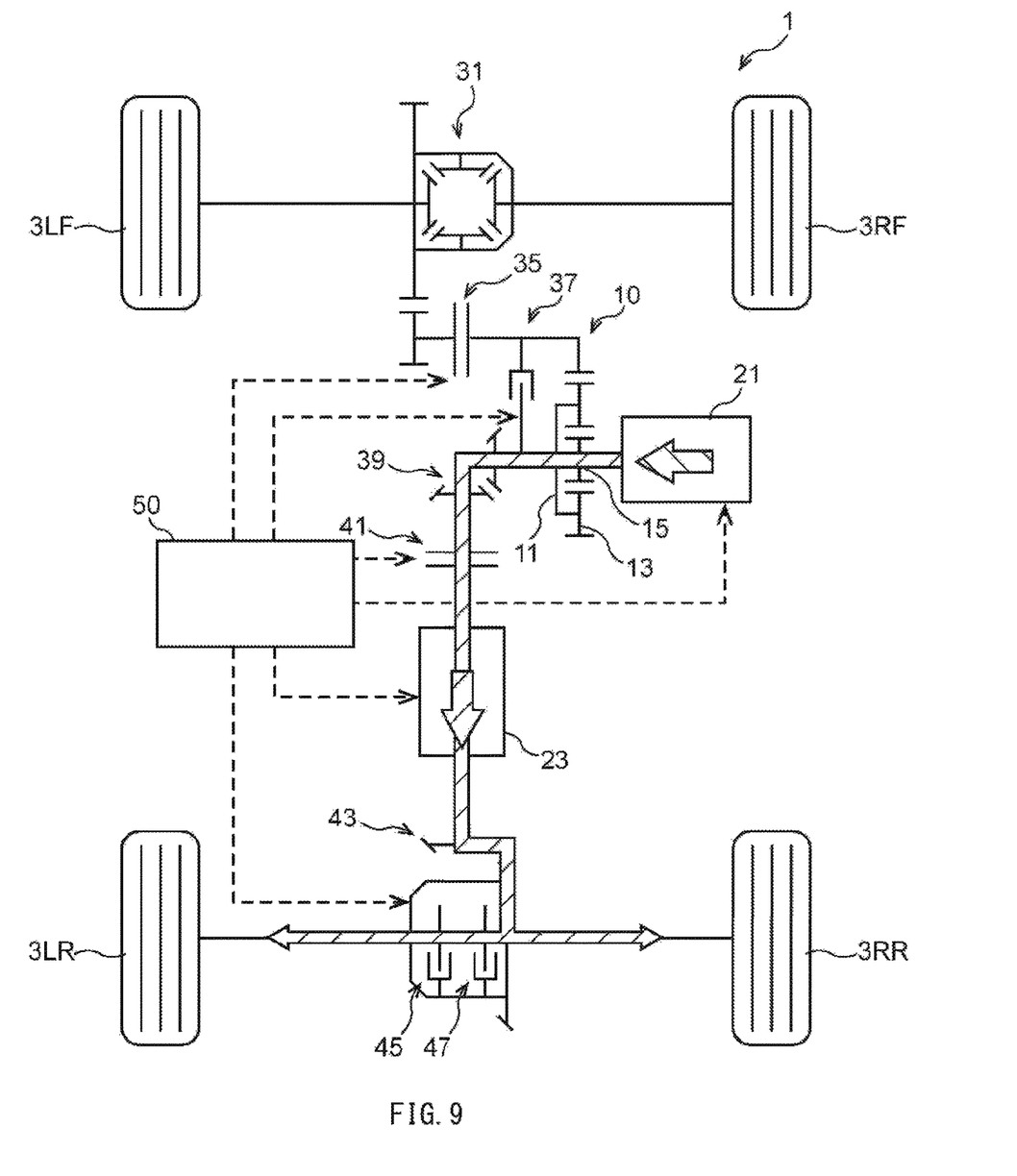
FIG. 9 is an explanatory diagram of the drive device, illustrating another operational example in the rear-wheel drive mode.

Next, an example of switching of a drive mode will be described below with reference to FIGS. 7 to 9. FIG. 7 is an explanatory diagram, in respective drive modes, of engagement states of the first clutch mechanism 41, the second clutch mechanism 35, the third clutch mechanism 37, the fourth clutch mechanism 45, and the fifth clutch mechanism 47, and drive states of the first motor 21 and the second motor 23.

In causing the vehicle to travel under front wheel driving, the controller 50 may set the first clutch mechanism 41, the fourth clutch mechanism 45, and the fifth clutch mechanism 47 in the disengaged state. Meanwhile, the controller 50 may set the second clutch mechanism 35 and the third clutch mechanism 37 in the engaged state. In this state, the controller 50 may control output of the first motor 21 in accordance with a requested driving force. This accordingly makes it possible to transmit, to the front wheel side, the output of the first motor 21 configured to efficiently transmit a driving force to the front wheel side, where no orthogonal gear is interposed, to cause the vehicle to travel (a state similar to the state illustrated in FIG. 5). In a case where the vehicle decelerates during front wheel driving, the controller 50 may perform a regeneration control for the first motor 21. This makes it possible to efficiently generate electric power.

In causing the vehicle to travel under front wheel driving, the controller 50 may otherwise set the third clutch mechanism 37, the fourth clutch mechanism 45, and the fifth clutch mechanism 47 in the disengaged state. Meanwhile, the controller 50 may set the first clutch mechanism 41 and the second clutch mechanism 35 in the engaged state. In this state, the controller 50 may control the output of the first motor 21 and the second motor 23. This accordingly makes it possible to transmit, to the front wheel side, the output of the first motor 21 and the second motor 23 to cause the vehicle to travel (this power transmission state may be similar to the state illustrated in FIG. 6).

In causing the vehicle to travel under rear wheel driving, the controller 50 may set the first clutch mechanism 41, the second clutch mechanism 35, and the third clutch mechanism 37 in the disengaged state. In this state, the controller 50 may control output of the second motor 23. The controller 50 may further variably control engagement forces of the fourth clutch mechanism 45 and the fifth clutch mechanism 47 in accordance with a turning state. This accordingly makes it possible to transmit, as illustrated in FIG. 8, the output of the second motor 23 to the rear wheel side to cause the vehicle to travel. In a case where the vehicle decelerates during rear wheel driving, the controller 50 may perform a regeneration control for the second motor 23. This makes it possible to generate electric power.

In causing the vehicle to travel under rear wheel driving, the controller 50 may otherwise set the second clutch mechanism 35 in the disengaged state. Meanwhile, the controller 50 may set the first clutch mechanism 41 and the third clutch mechanism 37 in the engaged state. In this state, the controller 50 may control output of either one of the first motor 21 and the second motor 23. The controller 50 may further variably control engagement forces of the fourth clutch mechanism 45 and the fifth clutch mechanism 47 in accordance with a turning state. This accordingly makes it possible to transmit, as illustrated in FIG. 9, the output of the two motors, i.e., the first motor 21 and the second motor 23, to the rear wheel side to cause the vehicle to travel. In a case where the vehicle decelerates during rear wheel driving illustrated in FIG. 9, the controller 50 may perform a regeneration control for either one of the first motor 21 and the second motor 23. This makes it possible to generate electric power. Note that the third clutch mechanism 37 may be engaged.

In causing the vehicle to travel under four wheel driving, the controller 50 may set the first clutch mechanism 41 and the second clutch mechanism 35 in the engaged state. Meanwhile, the controller 50 may set the third clutch mechanism 37 in the disengaged state or the engaged state. In this state, the controller 50 may control output of either one of the first motor 21 and the second motor 23. The controller 50 may further variably control engagement forces of the fourth clutch mechanism 45 and the fifth clutch mechanism 47 in accordance with a turning state. During four wheel driving, it is possible to perform the control of separately using the motors, as described above (see FIG. 3).

With the drive device 1 according to the example embodiment, as described above, it is possible to achieve an electric-motor four-wheel drive vehicle configured to separately use front wheel driving that is superior in maneuverability of the vehicle, rear wheel driving that is superior in traveling performance, and four wheel driving that is superior in turning performance and stability.

[2.3. Turning Performance]

As described above, the drive device 1 according to the example embodiment may include the fourth clutch mechanism 45 configured to adjust a driving force to be transmitted to the rear left wheel 3LR, and the fifth clutch mechanism 47 configured to adjust a driving force to be transmitted to the rear right wheel 3RR. Adjusting engagement forces of the fourth clutch mechanism 45 and the fifth clutch mechanism 47 (left and right vectoring) accordingly makes it possible to improving turning performance. By setting the first clutch mechanism 41 in the disengaged state to separate the front wheel side and the rear wheel side from each other, allowing the second motor 23 to drive the rear wheel side, and allowing the first motor 21 to drive at smaller output or to regeneratively drive the front wheel side, it is possible to adjust driving forces of the front and rear wheels, separately from left and right vectoring or in conjunction with left and right vectoring. This therefore makes it possible to improve controllability of yaw rotation of the vehicle, improving turning performance.

Some example embodiments of the disclosure have been described in detail with reference to the accompanying drawings. However, the disclosure is not limited to the example embodiments. It is apparent that persons skilled in the technical field of the disclosure may perceive various modification examples or alteration examples within the scope of the technical concept as defined by the following claims. It should be appreciated that the various modification examples or alteration examples obviously fall within the technical scope of the disclosure.

In the example embodiment described above, the first electric motor may be disposed on the front wheel side with respect to the first clutch mechanism, whereas the second electric motor may be disposed on the rear wheel side with respect to the first clutch mechanism. However, the disclosure it not limited to this arrangement. That is, the first electric motor may be disposed on the rear wheel side with respect to the first clutch mechanism, whereas the second electric motor may be disposed on the front wheel side with respect to the first clutch mechanism.

According to at least one embodiment of the disclosure, as described above, it is possible to provide a drive device, for an electric-motor four-wheel drive vehicle, that is configured to fully utilize output of the electric motors, as well as to drive the electric motors highly efficiently.

The controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 50 illustrated in FIG. 1.

The invention claimed is:

1. A drive device for an electric-motor four-wheel drive vehicle, the drive device comprising:
   a first clutch mechanism configured to perform switching between connection and disconnection of a power transmission system for front wheels and a power transmission system for rear wheels, wherein:
      a propeller shaft couples the power transmission system for the front wheels and the power transmission system for the rear wheels;
   a first electric motor disposed on one of a front wheel side or a rear wheel side with respect to the first clutch mechanism, the first electric motor being coupled to the first clutch mechanism, the front wheel side being a side on which the front wheels are provided and the rear wheel side being a side on which the rear wheels are provided;
   a second electric motor disposed on the other of the front wheel side or the rear wheel side with respect to the first clutch mechanism, the second electric motor being coupled to the first clutch mechanism;
   a second clutch mechanism configured to perform switching between connection and disconnection of the first electric motor and drive shafts for the front wheels;
   a planetary gear mechanism configured to distribute output of the first electric motor to the first clutch mechanism and the second clutch mechanism;
   a third clutch mechanism configured to limit a difference between a first rotational element in the planetary gear mechanism, the first rotational element being configured to transmit the output of the first electric motor to the first clutch mechanism, and a second rotational element in the planetary gear mechanism, the second rotational element being configured to transmit the output of the first electric motor to the second clutch mechanism; and
      an orthogonal gear disposed on a power transmission route between the first rotational element and the propeller shaft.

2. The drive device according to claim 1, wherein an output shaft of the first electric motor is disposed in parallel to the drive shafts for the front wheels and drive shafts for the rear wheels.

3. The drive device according to claim 1, wherein an output shaft of the second electric motor is disposed in a direction orthogonal to the drive shafts for the front wheels and drive shafts for the rear wheels.

4. The drive device according to claim 2, wherein an output shaft of the second electric motor is disposed in a direction orthogonal to the drive shafts for the front wheels and drive shafts for the rear wheels.

5. The drive device according to claim 1, further comprising a controller configured, during a first travel mode where first requested torque is requested,
   to engage the first clutch mechanism and the second clutch mechanism,
   to disengage the third clutch mechanism,
   to control the second electric motor to prevent the first rotational element from rotating, and
   to control the output of the first electric motor, in accordance with the first requested torque.

6. The drive device according to claim 2, further comprising a controller configured, during a first travel mode where first requested torque is requested,
   to engage the first clutch mechanism and the second clutch mechanism,
   to disengage the third clutch mechanism,
   to control the second electric motor to prevent the first rotational element from rotating, and
   to control the output of the first electric motor, in accordance with the first requested torque.

7. The drive device according to claim 5, wherein the controller is configured, during a second travel mode where second requested torque lower than the first requested torque is requested,
   to engage the second clutch mechanism and the third clutch mechanism,
   to control the output of the first electric motor, and
   to control or stop output of the second electric motor, in accordance with the second requested torque.

8. The drive device according to claim 6, wherein the controller is configured, during a second travel mode where second requested torque lower than the first requested torque is requested,
   to engage the second clutch mechanism and the third clutch mechanism,
   to control the output of the first electric motor, and
   to control or stop output of the second electric motor, in accordance with the second requested torque.

9. The drive device according to claim 5, wherein the controller is configured, during a transition from the first travel mode to the second travel mode,
   to engage the first clutch mechanism and the second clutch mechanism,
   to allow an engagement force of the third clutch mechanism to gradually change, and
   to allow the output of the first electric motor and the output of the second electric motor to gradually change to replace each other.

10. The drive device according to claim 6, wherein the controller is configured, during a transition from the first travel mode to the second travel mode,
    to engage the first clutch mechanism and the second clutch mechanism,
    to allow an engagement force of the third clutch mechanism to gradually change, and
    to allow the output of the first electric motor and the output of the second electric motor to gradually change to replace each other.

11. The drive device according to claim 1, further comprising:
    a differential mechanism coupled between the drive shafts for the front wheels;
    a fourth clutch mechanism coupled to the drive shaft for a rear right wheel of the rear wheels, the fourth clutch mechanism being configured to adjust transmission of power to the rear right wheel; and
    a fifth clutch mechanism coupled to the drive shaft for a rear left wheel of the rear wheels, the fifth clutch mechanism being configured to adjust transmission of power to the rear left wheel.

12. The drive device according to claim 2, further comprising:
    a differential mechanism coupled between the drive shafts for the front wheels;
    a fourth clutch mechanism coupled to the drive shaft for a rear right wheel of the rear wheels, the fourth clutch mechanism being configured to adjust transmission of power to the rear right wheel; and
    a fifth clutch mechanism coupled to the drive shaft for a rear left wheel of the rear wheels, the fifth clutch mechanism being configured to adjust transmission of power to the rear left wheel.

13. The drive device according to claim 1, wherein
the first electric motor is disposed on the front wheel side with respect to the first clutch mechanism, and
the second electric motor is disposed on the rear wheel side with respect to the first clutch mechanism.

14. The drive device according to claim 2, wherein
the first electric motor is disposed on the front wheel side with respect to the first clutch mechanism, and
the second electric motor is disposed on the rear wheel side with respect to the first clutch mechanism.

15. A drive device for an electric motor four wheel drive vehicle, the drive device comprising:
a first clutch mechanism configured to perform switching between connection and disconnection of a power transmission system for front wheels and a power transmission system for rear wheels, wherein:
a first electric motor configured to transmit an output torque of the first electric motor to one of a front wheel side or a rear wheel side with respect to the first clutch mechanism without passing through the first clutch mechanism, the first electric motor being coupled to one side of the first clutch mechanism, the front wheel side being a side on which the front wheels are provided and the rear wheel side being a side on which the rear wheels are provided;
a second electric motor configured to transmit an output torque of the second electric motor to the other of the front wheel side or the rear wheel side with respect to the first clutch mechanism without passing through the first clutch mechanism, the second electric motor being coupled to an another side of the first clutch mechanism;
a second clutch mechanism configured to perform switching between connection and disconnection of the first electric motor and drive shafts for the front wheels;
a planetary gear mechanism configured to distribute output of the first electric motor to the first clutch mechanism and the second clutch mechanism; and
a third clutch mechanism configured to limit a difference between a first rotational element in the planetary gear mechanism, the first rotational element being configured to transmit the output of the first electric motor to the first clutch mechanism, and a second rotational element in the planetary gear mechanism, the second rotational element being configured to transmit the output of the first electric motor to the second clutch mechanism.

* * * * *